UNITED STATES PATENT OFFICE.

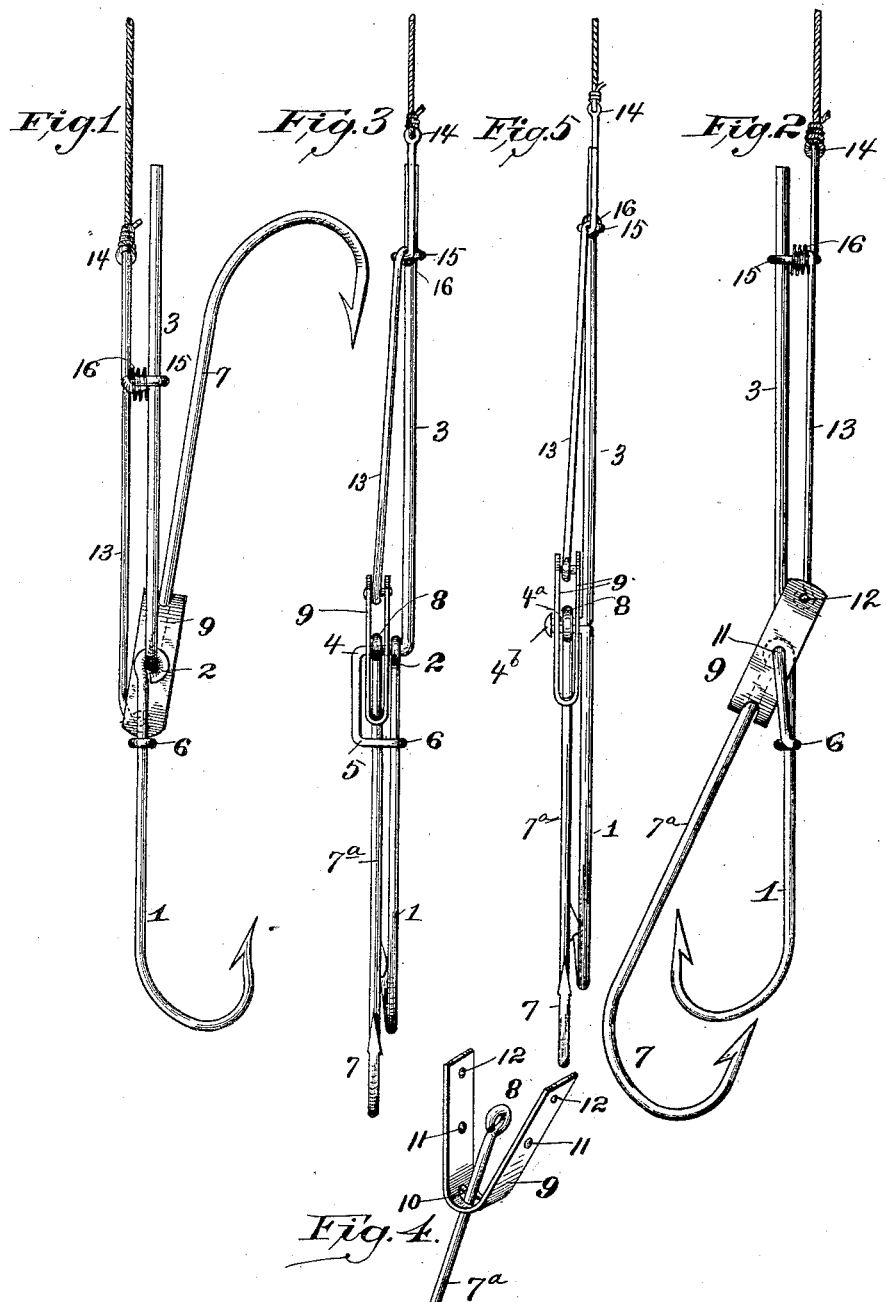

JUNIA H. LATHROP, OF NORTHFIELD, MINNESOTA.

FISH-HOOK.

SPECIFICATION forming part of Letters Patent No. 426,027, dated April 22, 1890.

Application filed January 30, 1890. Serial No. 338,588. (No model.)

*To all whom it may concern:*

Be it known that I, JUNIA H. LATHROP, a citizen of the United States, residing at Northfield, in the county of Rice, State of Minnesota, have invented certain new and useful Improvements in Fish-Hooks; and I hereby declare the following to be a full, clear, and exact description of the same, reference being had to the accompanying drawings, wherein—

Figure 1 is an enlarged elevation of one side of a double or grip hook embodying my invention, the hooks being set. Fig. 2 is a similar view taken from the reverse side, the hooks being closed, as in holding a fish. Fig. 3 is an edge or rear view of the same. Fig. 4 is a detached or detail view of the grip-hook and its pivot-plate. Fig. 5 is a view of a modification, in which the staff is a continuation of the bait-hook instead of a separate piece.

Like symbols refer to like parts wherever they occur.

My invention relates to the construction of that class of fish-hooks generally termed "trap-hooks," wherein there is combined with the hook which carries the bait a second hook intended to close upon the fish and assist the first or bait hook in holding the fish when it has been struck or secured on the bait-hook. Heretofore in this class of trap-hooks the construction usually adopted has been to loosely pivot or swing the bait-hook on the shank of the strike-hook and to connect the strike-hook directly to the line. In such a construction the fish must be firmly secured on the bait-hook before the strike-hook can be forced into the fish, and even when so secured the effective power of the strike-hook depends largely on the pull or play of the fish.

The object I have in view is to avoid the above-specified objectionable construction, and to so combine the two hooks as to obtain the direct and effectual pull of the line on both hooks.

To this end the invention may be generally stated to consist in combining with a rigid or fixed bait-hook, said hook having a hook-staff, a grip-hook pivoted on the rigid bait-hook, and a pull-rod pivotally connected with the grip-hook with a guide-loop for the hook-staff, which latter can be so connected with the line that the direct pull of the line may be exerted on both hooks, whereby a "grip-hook" rather than a strike-hook or trap-hook is obtained.

There are other minor points of invention, all of which will hereinafter more fully appear.

I will now proceed to describe my invention more fully, so that others skilled in the art to which it appertains may apply the same.

In the drawings, 1 indicates the bait-hook, which may be of any desired form or size, provided at its upper end with an eye 2 or equivalent means for securing it to the hook-staff 3.

3 indicates the hook-staff to which the bait-hook 1 is attached, said staff formed with a bend 4, which serves as a pivot or fulcrum for the grip-hook, and a return-arm 5, having an eye 6, through which the shank of the bait-hook 1 passes. It will be noticed the result of this construction—viz., the passage of the staff 3 through the eye 2 on the end of the bait-hook and the shank of the bait-hook through the eye 6 on the end of the shaft—is to rigidly connect the parts, and an equivalent result will be produced by forming the staff 3 as a continuation of the shank of bait-hook 1, as shown in the modification, Fig. 5. In the modified construction the wire may be bent upon itself when making the hook to form a pivot $4^a$ for the grip-hook, and as this part—the staff—need not be tempered the grip-hook can be secured by subsequently heading up the end of pivot $4^a$, as indicated at $4^b$, Fig. 5. This hook-staff 3 also serves as a guide for the pull-rod of the grip-hook.

7 indicates the grip-hook, which may be of any desired size or form, its shank $7^a$ being preferably of sufficient length to allow it to extend beyond the bait-hook when closed into the position shown in Fig. 2. The upper end of the shank of the grip-hook is provided with an eye 8 or equivalent means, whereby the said grip-hook may be pivoted on the staff 3 or the bend 4 thereof. This grip-hook is controlled and operated by a yoke or lever 9 and a pull-rod (or wire) 13. The yoke or lever 9 is preferably formed of a flat plate or ribbon of metal (see Fig. 4) having a central elongated slot 10 large enough for the passage of the barb of the hook, said plate folded at the middle and provided with pivot-holes 11 for the passage of the pivot or bend 4 on the hook-staff, and near its ends with pivot-holes 12 for the pivot which connects said yoke or lever 9 with the lower end of the pull-rod 13.

13 indicates the pull-rod of the grip-hook. Said pull-rod is pivoted at its lower end to the lever 9 of the grip-hook, as before specified, and is provided at its opposite end with an eye 14 or equivalent means for the attachment of the line, and is also provided within its length with an eye or guide-loop 15, adapted to receive the hook-staff, which staff acts as a guide to the pull-rod. In order to obtain such slight friction between the guide-loop 15 and hook-staff 3 as is necessary to support the grip-hook 7 when set or in the position shown in Fig. 1, a small spring 16, preferably a spiral spring, is placed on the guide-loop 15, and bears on both the pull-rod 13 and the hook-staff 3.

In fitting up the grip-hook in its preferred form the grip-hook 7 may be passed through the slot 10 of plate 9, the plate then folded, and the pull-rod 13 secured to the end of said lever or yoke 9. The hook-staff 3 may then be bent, as at 4, to form the shoulder for the eye 2 of bait-hook 1 and the pivot for lever or yoke 9 of grip-hook 7. The eye of the bait-hook may then be passed over said pivot or shoulder, as shown in Fig 3, the guide-loop 15 of the pull-rod 13 passed over hook-staff 3 and the eye 8 of the grip-hook 7, and the pivot-holes 11 of lever 9 passed over said pivot or shoulder 4, all as indicated in Fig. 3, after which the lower end of the hook-staff may be bent to form arm 5, and the eye 6 formed to inclose the shank of the bait-hook 1 and hold it rigid, as hereinbefore set forth.

When in use, the grip-hook will be raised, as shown in Fig. 1, which will draw down the pull-rod, and the slight friction of the guide-loop 15 on hook-staff 3 will hold the parts in said position until a pull is exerted on either the bait-hook or the line. When a pull is made on the line, the power is exerted directly on the lever and the grip-hook 7, and also through the hook-staff 3, directly on the bait-hook 1, so that the hooks close with a gripping rather than a striking action.

The advantages of the preferred construction shown in Figs. 1, 2, and 3, is that it enables me to use the ordinary fish-hook of any desired size, while in the modified form shown in Fig. 5 it will be necessary to have hooks of different sizes specially made with the hook-staff 3 continuous with the bait-hook. I do not, however, intend to limit the scope of my invention to the particular construction hereinbefore described; but,

Having thus described my invention, what I claim, and desire to secure by Letters Patent, is—

1. In a trap-hook, the combination of a bait-hook provided with a hook-staff, a grip-hook pivoted on the staff of the bait-hook, and a pull-rod pivotally connected with the grip-hook and having a guide-loop for the hook-staff, substantially as and for the purposes specified.

2. In a trap-hook, the combination of a bait-hook provided with a hook-staff, a grip-hook pivoted on the hook-staff, a pull-rod pivotally connected with the grip-hook and having a guide-loop for the hook-staff, and a spring for causing friction of the guide-loop on the hook-staff, substantially as and for the purposes specified.

3. In a trap-hook, the combination, with a bait-hook having an eye for the reception of a hook-staff, of a hook-staff having an eye for the reception of the shank of the bait-hook and a bend for the pivot of the grip-hook, and a grip-hook pivoted on the bend of the hook-staff, substantially as and for the purposes specified.

4. In a trap-hook, the combination, with a bait-hook, of a hook-staff, a grip-hook pivoted on the hook-staff, and a yoke or lever formed of a folded plate having a slot for the reception of the shank of the grip-hook, and pivot-holes for the reception of the hook-staff, substantially as and for the purposes specified.

5. In a trap-hook, the combination of a bait-hook having an eye for the reception of a hook-staff, a hook-staff having an eye for the reception of the shank of the bait-hook, a grip-hook having an eye by which it is pivoted on the hook-staff, a yoke or lever for controlling the grip-hook, and a pull-rod pivotally connected with the yoke or lever of the grip-hook and having a guide-loop which receives the hook-staff, substantially as and for the purposes specified.

In testimony whereof I affix my signature in presence of two witnesses, this 27th day of January, 1890.

JUNIA H. LATHROP.

Witnesses:
O. F. PERKINS,
R. J. DRAKE.